United States Patent [19]

Binsfeld

[11] Patent Number: 4,572,261

[45] Date of Patent: Feb. 25, 1986

[54] PNEUMATIC TIRE TREAD

[75] Inventor: Adrien Binsfeld, Colmar-Berg, Luxembourg

[73] Assignee: The Goodyear Tire & Rubber Company, Akron, Ohio

[21] Appl. No.: 565,785

[22] Filed: Dec. 27, 1983

[51] Int. Cl.⁴ .............................................. B60C 11/04
[52] U.S. Cl. .................................. 152/209 R; D12/143
[58] Field of Search ............ 152/209 R, 209 D, 209 B, 152/209 A; D12/142, 143, 145, 151

[56] References Cited

FOREIGN PATENT DOCUMENTS

| 755137 | 8/1956 | United Kingdom . |
| D. 895048 | 1/1960 | United Kingdom . |
| D. 954423 | 11/1971 | United Kingdom . |
| 2042992 | 10/1980 | United Kingdom . |
| 1002285 | 12/1981 | United Kingdom . |

Primary Examiner—Michael Ball
Attorney, Agent, or Firm—L. R. Drayer

[57] ABSTRACT

A pneumatic tire having a tread portion comprises a mid-circumferential zig-zag rib and a plurality of blocks located in the edge portions of the tread between adjacent peaks of the zig-zag rib. The zig-zag rib has amplitude of between 60–70% of the tread width and has sied faces thereon that have an exposed length of at least 40% of the tread width. By varying the width of the grooves, between the blocks and the rib, on one rotational directional side of the rib from the width of the grooves on the other rotational directional side of the rib, it is possible for the tire to have different traction grips for each rotational direction.

11 Claims, 3 Drawing Figures

PNEUMATIC TIRE TREAD

BACKGROUND OF THE INVENTION

This invention relates to pneumatic tires and primarily to tires for vehicles used in cross-country applications.

Typical vehicles used in cross-country applications often have four wheel drive and are fitted with tires that have prominent tread patterns to provide traction in mud and sand. As used herein "cross-country" refers to off-the-highway operation of vehicles.

Typical cross-country tires are directional to provide good grip and self cleaning properties going forwards but this results in poor traction and self cleaning when the tires rotate in reverse. Tread patterns for cross-country tires are typically bar type treads, or block type treads that give good traction but compromise on lateral stability and when used on highway applications can be noisy and give an uncomfortable ride. Other tread patterns, for example as shown in British Patent Application No. 2 042 992, have been developed having a mid circumferential zig-zag rib with blocks located in the edge portion of the tread on either side of the central rib. The blocks provide the traction for the cross-country applications and the central rib provides favourable traction and ride for highway applications. However, because these prior art tread designs are a compromise between cross-country and highway uses they are not as efficient in off-the-highway applications as they might be.

Accordingly there is provided a pneumatic tire having a tread portion with a pair of lateral edges which are spaced apart by a given tread width and comprising a zig-zag rib at the mid-circumference of the tire and having an amplitude of between 60-70% of the tread width and having side faces thereon each of which is directed in one of the two rotational directions of the tire, the side faces each having a length of at least 40% of the tread width, and blocks located in the edge portions of the tread between adjacent peaks on the zig-zag rib.

The long length of exposed side face on the central rib provides good off-road traction, whilst the high amplitude zig-zag rib provides for a good highway ride.

Preferably said side faces on the rib are first side faces directed in one rotational direction, and second side faces directed in the opposite rotational direction, and the blocks each have two faces thereon each of which is substantially parallel to a respective one of the first and second sides faces on the rib and forming therebetween a first and second groove respectively, the width of each first groove being between 10-15% of the tread width, and the width of each second groove being between 35-100% of the width of the first groove.

By varying the width of the first grooves and the second grooves it is possible to obtain different degrees of traction for the two directions of rotation of the tire.

BRIEF DESCRIPTION OF DRAWINGS

The invention will be described by way of example and with reference to the accompaying drawings in which.

DETAILED DESCRIPTION OF INVENTION

Figure 1:
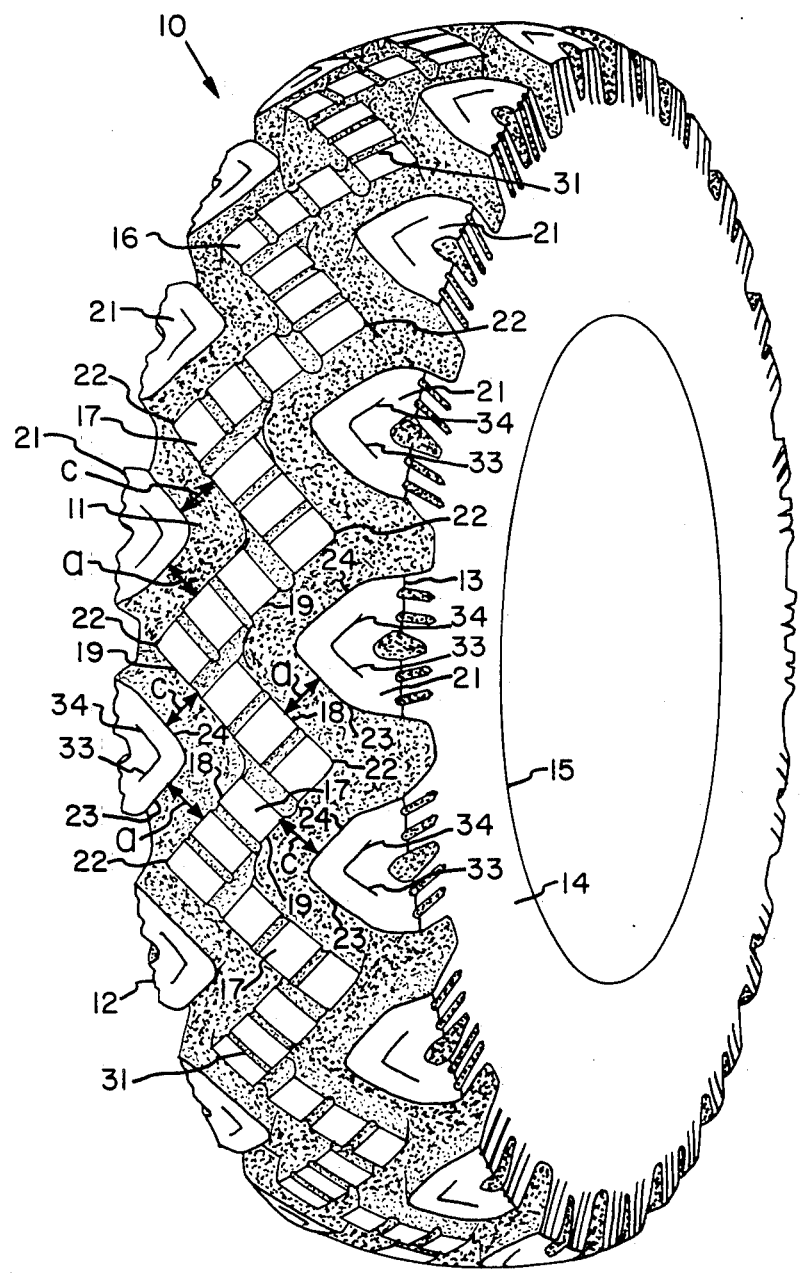
FIG. 1 is a perspective drawing of a first tire according to this invention.
Figure 2:
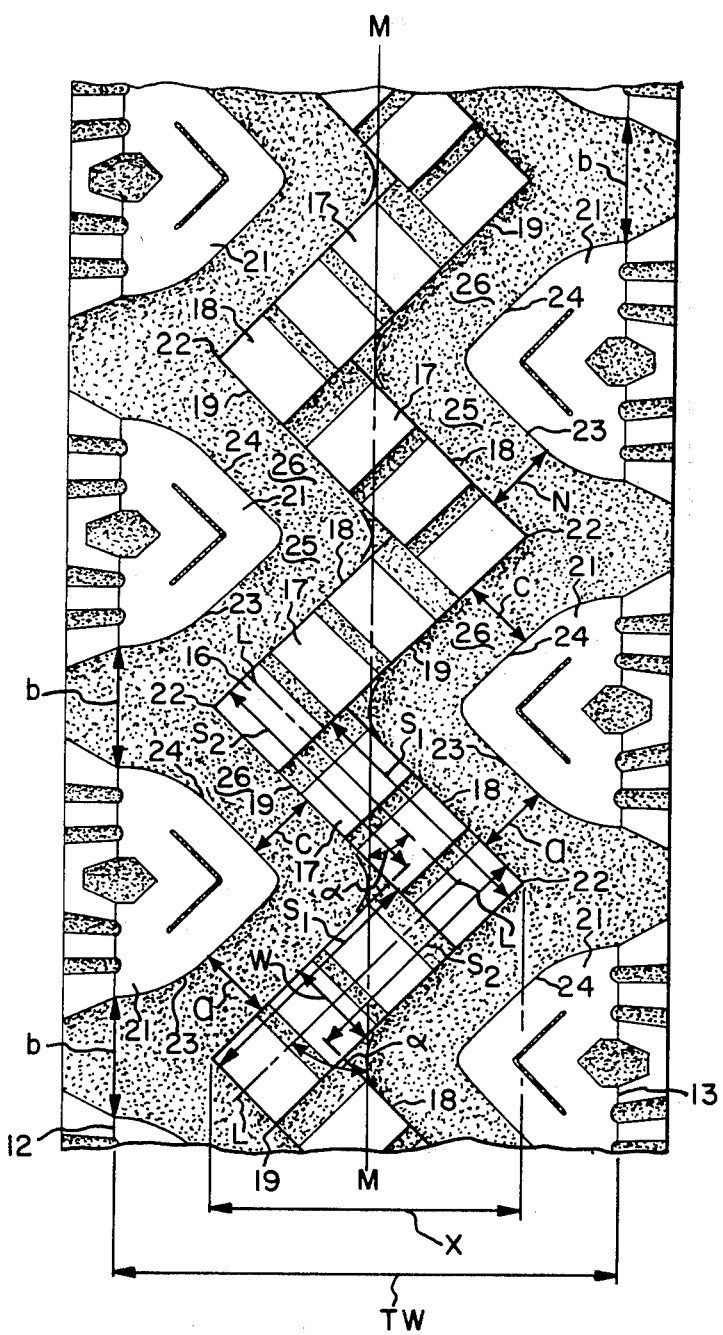
FIG. 2 is an enlarged fragment of the tread portion of the first tire of FIG. 1.

With reference to FIG. 1 and FIG. 2, there is illustrated a cross-country tire 10, preferably of radial type construction, for mounting on cross-country four wheel drive vehicles. The tire 10 has a tread portion 11 extending circumferentially thereabout, with a pair of lateral edges 12 and 13 spaced apart by tread width TW.

The tread width TW for the purposes of this invention, is defined as as the axial distance across as measured from the footprint of the tire when inflated to a design pressure and subjected a rated load. The tread portion 11 is connected by sidewalls 14 to a pair of beads 15. For the purposes of this invention axial and axially refer to the axis of rotation of the tire, and radial and radially refer to directions perpendicular to the axis of rotation of the tire.

The tread portion 11 comprises a zig-zag rib 16 extending circumferentially about the tire and centered axially with respect to the mid-circumferential plane M—M of the tire. For the purposes of this invention the mid-circumferential plane is a plane perpendicular to the axis of rotation of the tire, disposed midway between the sidewalls of the tire. The zig-zag rib 16 has an amplitude X of between 60-70% of the tread width TW and preferably 62% of the tread width TW. The amplitude is the axial distance across the tread between circumferentially adjacent peaks 22 on the zig-zag rib 16. The rib 16 has a width W of between 15-20% of the tread width TW and preferably 20% of the tread width TW, when measured perpendicularly of the zig-zag center line L of the rib 16. The segments 17 of the zig-zag rib are arranged such that the zig-zag center line L of the rib always intersects the mid-circumferential plane M—M at an angle of 45°.

The rib 16 because of its zig-zag nature has radially projecting side faces 18 and 19 thereon that are respectively first side faces 18 directed in one rotational direction for the tire, and second side faces 19 that are directed in the opposite rotational direction for the tire. The side faces 18 and 19 have lengths $S_1$ and $S_2$ respectively measured parallel to the zig-zag center line L, of at least 40% of the tread width TW, but preferably about 50% of the tread width. The zig-zag rib 16 is interrupted by a plurality of spaced shallow grooves 31 which are perpendicular to the rib center line L. The shallow grooves 31 are between ⅛ and ⅜ of the tread depth. As used herein the "tread depth" or "full depth of the tread" is understood to mean the height of the side faces 18 and 19 of the rib as measured in a radial direction on a newly molded tire made according to the present invention.

A series of blocks 21 are located in the edge portions of the tread portion 11. In each respective edge portion, each block 21 is located between adjacent peaks 22 of the rib 16 that are in that respective edge portion. The blocks 21 each have a substantially triangular ground contacting surface and each has two radially projecting faces 23 and 24 thereon. The blocks 21 each have blades 33 and 34 (also known as sipes) that extend to almost the full depth of the tread. The blades 33 and 34 are parallel with the faces 23 and 24, respectively, and are joined together in an arrow-like formation pointing towards the mid-circumferential plane M—M. The faces 23 and 24 on each block 21, are opposite to the side faces 18 and 19 of the rib 16 and form therebetween a series of circumferentially alternating linked first and second grooves 25 and 26 respectively. The first groove 25 has a width 'a' of between 10-15% of the tread width and the second groove 26 has a width 'c' of between 35-100% of the width of the first groove.

In this embodiment of the invention, the first and second grooves 25 and 26 have equal widths 'a' and 'c' (as measured perpendicularly to the center line of the groove) which are approximately 15% of the tread width TW.

The blocks 21 are spaced circumferentially at the lateral edges 12 and 13 of the tread by a distance 'b' which is between 100% to 200% of the width 'a' of the first grooves 25, and preferably 165% of width thereof. The first and second grooves 25 and 26 between each block 21 and the rib 16 are progressively enlarged towards the respective tread edge 12 or 13 to open into the spaces 'b' between adjacent blocks 21.

Because the first and second grooves 25 and 26 both have the same width, the tire will have substantially equal traction in the forward and reverse directions of rotation. The wide circumferential spacing between the blocks 21 gives good self cleaning properties for the tread portion. For each direction of rotation in the footprint of the tire, the mud or sand will hit the respective side face 18 or 19 of the rib 16 which is facing in that direction and the mud or sand will be deflected along the side face and out of the footprint of the tread via the space 'b' between the blocks 21.

Figure 3:
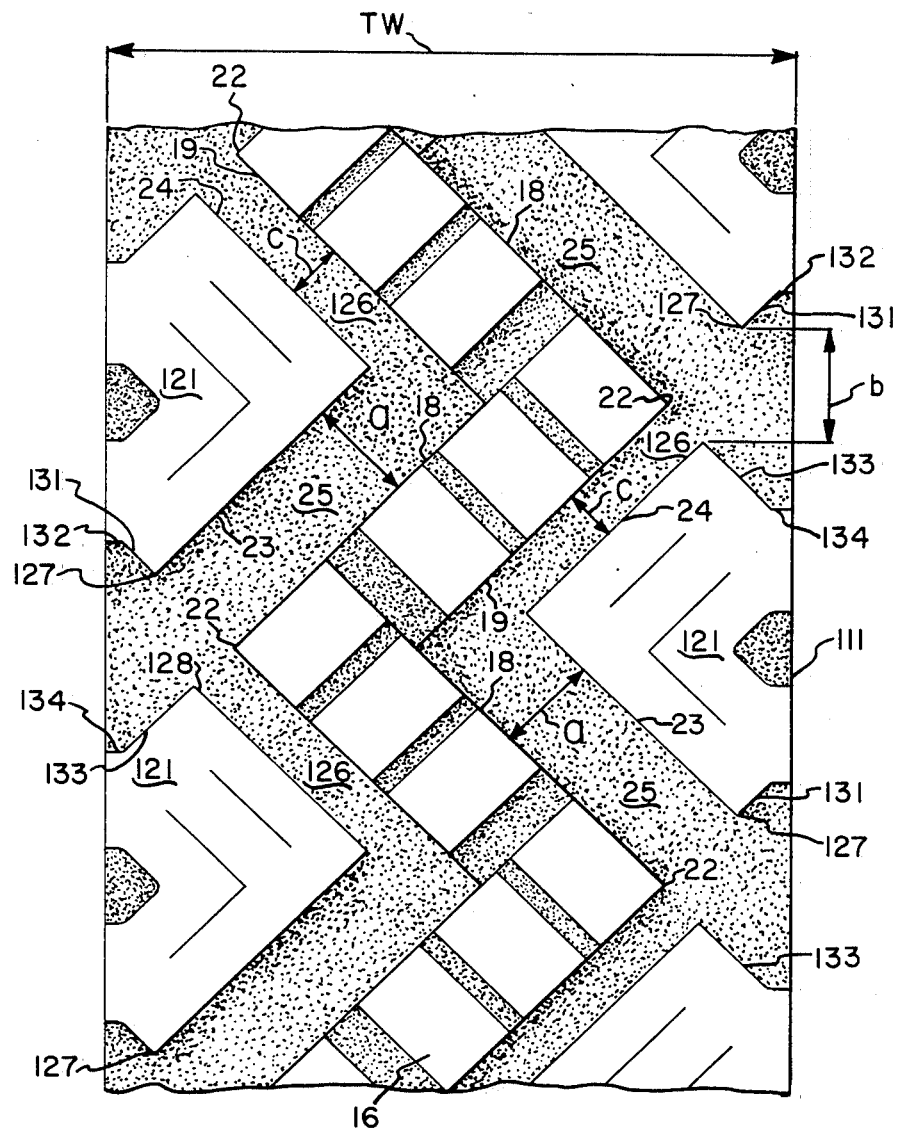
FIG. 3 is a fragment of an alternative tread portion of a second tire also according to this invention.

A further embodiment of the invention is illustrated in FIG. 3 which is a fragmentary view of the tread portion 111 of a second tire according to this invention. Because of the similarity between FIG. 3 and FIG. 2 only those parts which are different will be given new reference indicator numbers.

The tread portion 111 has a tread width TW and a zig-zag rib 16 which is identical with that described for FIG. 1 and FIG. 2. Blocks 121 are located in the edge portions of the tread portion 111 between adjacent peaks 22 of the rib 16 that point towards the same lateral edge of the tread portion. The blocks 121 are of modified shape when compared with the blocks 21 previously described.

For each block 121 the first groove 25, between the radially projecting face 23 on the block 121, and the opposite radially projection side face 18 on the rib, has a width 'a' as previously described. However, the length of the face 23 on the block 121 has been increased so that the other radially projecting face 24 on the block and its opposite side face 19 on the rib have a second groove 126 therebetween which has a width 'c' which is 50% of the width 'a' of the first groove 25.

Also the grooves 25 and 126 are not progressively enlarged towards the spaces 'b' between adjacent blocks 121 but are opened out from corners 127 and 128 by a series of steps 131, 132 and 133, and 134 respectively. The steps 131 and 133 have radially projecting surfaces that align with the faces 18 and 19 respectively on the rib 16. The space 'b' between the corners 127 and 128 of adjacent blocks 121 is 95% of the width 'a' of the first grooves 25.

Because the first grooves 25 have a width 'a' which is wider than the width 'c' of the second grooves 126, the tire will have different traction grip for each of the two directions of rotation.

For example, when the tire rotates for forwards movement of the vehicle on which it is mounted then as the side faces 18 on the rib 16 advance against the ground, the mud, sand, etc will move down the wider first grooves 25 along the faces 18 and exit the tread portion through the circumferentially spaces 'b' between the blocks. Similarly when the tire rotates in the reverse direction, the mud or sand will move down the narrower second grooves 126, along the faces 19 and also exit the tread through the spaces 'b'. Because the second grooves 126 are only 50% of the width of the first grooves 25, the dirt clearance is not as efficient and the tire will have less traction grip in this direction of rotation than in the other.

Tests have shown that the traction grip of the tire in the reverse mode vary between 60% and 85% of the traction grip in the forward mode depending upon the condition, in which the tire is operating. The closer spacing 'b' between the blocks 121 of the embodiment shown in FIG. 3 as compared with the spacing between the blocks 21 of the embodiment shown in FIG. 2 slightly reduces the clearance for evacuating mud and sand between adjacent blocks, but alignment of the surfaces 131 and 133 on the block 121 with the side bases 18 and 19 of the rib helps to offset this effect and also provides effective extensions to the side faces 18 and 19 of the rib.

In order to make mud clearance more effective the first and second grooves 25 and 126 can be progressively enlarged as previously shown for FIG. 1 and FIG. 2.

The tread portion 111 could be altered to give the same traction grip for the vehicle moving in the reverse direction as in the forward direction. This can be simply achieved by making width 'a' of the first grooves 25 narrower than the width 'c' of the second grooves 126, for example the relationship between the widths of the first and second grooves 'a' and 'c' described above could be reversed for the tread to one side of the mid-circumferential plane M—M.

It is obvious that the tread portion shown in FIG. 3 could be modified in a number of different ways. The relative widths of the first and second grooves can be varied so that the width of the second groove lies between 35%-100% of the width of the first groove. This is achieved by displacing the face 24 on the block 121 to widen or narrow the groove 126.

While certain representative embodiments and details have been shown for the purpose of illustrating the invention, it will be apparent to those skilled in the art that various changes could be made without departing form the scope of invention.

What is claimed is:

1. A pneumatic tire having a tread portion comprising a pair of lateral edges which are spaced apart by a given tread width, a zig-zag rib extending circumferentially about the tire and centered axially with respect to the mid-circumferential plane of the tire and having an amplitude of between 60-70% of the tread width, said rib having a width of between 15-20% of the tread width when measured perpendicularly of a zig-zag center line of the rib, said rib having side faces thereon each of which is directed in one of the two rotational directions of the tire, the side faces each having a length of about 50% of the tread width, said rib being interrupted by a plurality of spaced shallow grooves which are perpendicular to the center line of the rib and have depths of between $\frac{1}{3}$ and $\frac{2}{3}$ of the tread depth, and a series of blocks located in the edge portions of the tread between adjacent peaks of the zig-zag rib, each of said blocks having a substantially triangular ground contacting surface.

2. A pneumatic tire as claimed in claim 1 wherein the width of the zig-zag rib is about 20% of the tread width.

3. A tire as claimed in claim 2 wherein the the zig-zag rib has a zig-zag center line that makes an angle of 45 degrees with the mid-circumferential plane of the tire.

4. A tire as claimed in claim 1 wherein said side faces on the zig-zag rib comprise first side faces directed in one rotational direction, and second side faces directed in the opposite rotational direction and the blocks each have two faces thereon, each of which is substantially parallel to a respective one of the first and second side faces and forming therebetween a first and a second groove respectively, the width of each first groove being between 10–15% of the tread width, and the width of each second groove being between 35–100% of the width of the first groove.

5. A tire as claimed in claim 4 wherein the second grooves each have a width equal to the width of the first grooves.

6. A tire as claimed in claim 4 wherein the blocks are circumferentially spaced apart by a distance which is between 100%–200% of the width of the first groove.

7. A tire as claimed in claim 5 wherein the blocks are circumferentially spaced apart by a distance which is between 100%–200% of the width of the first groove.

8. A tire as claimed in claim 6 wherein the block are circumferentially space apart by a distance of about 165% of the width of the first groove.

9. A tire as claimed in claim 7 wherein the blocks are circumferentially space apart by a distance of about 165% of the width of the first groove.

10. A pneumatic tire having a tread portion comprising a pair of lateral edges which are spaced apart by a given tread width, a zig-zag rib extending circumferentially about the tire and centered axially with respect to the mid-circumferential plane of the tire and having an amplitude of between 60–70% of the tread width, said rib having a width of between 15–20% of the tread width when measured perpendicularly of a zig-zag center line of the rib, said rib being interrupted by a plurality of spaced shallow grooves which are perpendicular to the center line of the rib and have depths of between $\frac{1}{3}$ and $\frac{2}{3}$ of the tread depth, said zig-zag rib having a plurality of first side faces directed in one rotational direction of the tire, and a plurality of second side faces directed in the other rotational direction of the tire, and blocks located in the edge portions of the tread between adjacent peaks of the zig-zag rib, said blocks each having two faces thereon each of which is substantially parallel to a respective one of the first and second side faces of the zig-zag rib forming therebetween a first groove and a second groove respectively, the width of each first groove being between 10–15% of the tread width and the width of each second groove being between 35–100% of the width of each first groove.

11. A pneumatic tire as claimed in claim 1 wherein each second groove is 35% of the width of each first groove.

* * * * *

UNITED STATES PATENT AND TRADEMARK OFFICE
CERTIFICATE OF CORRECTION

PATENT NO. : 4,572,261

DATED : February 25, 1986

INVENTOR(S) : Adrien Binsfeld

It is certified that error appears in the above-identified patent and that said Letters Patent is hereby corrected as shown below:

```
     In the Abstract, line 5, delete "sied" and replace
  therewith --side--.
```

Signed and Sealed this

Twenty-first Day of October, 1986

[SEAL]

Attest:

DONALD J. QUIGG

Attesting Officer

Commissioner of Patents and Trademarks